(12) United States Patent
Crowley

(10) Patent No.: US 6,505,180 B1
(45) Date of Patent: Jan. 7, 2003

(54) INFORMATION ENCODING AND RETRIEVAL THROUGH SYNTHETIC GENES

(75) Inventor: William L. Crowley, Eagle, ID (US)

(73) Assignee: Wm. L. Crowley & Associates, Inc., Eagle, ID (US)

( * ) Notice: Subject to any disclaimer, the term of this patent is extended or adjusted under 35 U.S.C. 154(b) by 0 days.

(21) Appl. No.: 09/393,407

(22) Filed: Sep. 10, 1999

Related U.S. Application Data
(60) Provisional application No. 60/099,713, filed on Sep. 10, 1998.

(51) Int. Cl.$^7$ .............................................. G06F 15/18
(52) U.S. Cl. ......................................................... 706/13
(58) Field of Search ........................................... 706/13

(56) References Cited

U.S. PATENT DOCUMENTS

| | | | | |
|---|---|---|---|---|
| 5,343,554 A | | 8/1994 | Koza et al. .................... | 706/13 |
| 5,390,282 A | * | 2/1995 | Koza et al. .................... | 706/13 |
| 5,434,796 A | | 7/1995 | Weininger .................... | 703/12 |

OTHER PUBLICATIONS

Moritz, *Mimetic Science: I—General Introduction*, The Institute for Mimetic Research (1990).
J. Grefenstette, "Multilevel Credit Assignment in a Genetic Learning System" Proceedings of the Second International Conference on Genetic Algorithms, 1987 (pp. 202–207).
M. Srinivas, et al., "Genetic Algorithms: A Survey", Computer, vol. 27, No. 6, pp 17–26, Jun. 1994.
D. Goldberg, Genetic Algorithms in Search, Optimization, and Machine Learning, pp 10–20, 80–139, Addison Wesley, 1989.
W.B.Dress, "Darwinian Optimization of Synthetic Neural Systems", IEEE First International Conference on Neural Networks, San Diego, Jun. 1987, vol. No. 3, pp. 769–775.
Schaffer et al., "An Adaptive Crossover Distribution Mechanism for Genetic Algorithms", Proceedings of the 2nd International Conference on Genetic Algorithms, Jul. 28–31, 1987, pp 36–40.
M. Mitchell, "An Introduction to Genetic Algorithms", pp 87–113, MIT Press 1996.
A. Srb, "General Genetics", pp 2–26, 265–284, W. H. Freeman and Company, 1965.
S. Kauffman, The Origins of Order, pp 411–439, 441–442, Oxford University Press, 1993.

* cited by examiner

*Primary Examiner*—George B. Davis
(74) *Attorney, Agent, or Firm*—Chapman and Cutler

(57) ABSTRACT

A system and method are taught for transforming complex data sets into compact, rule-based data structures comprised of synthetic gene-like sequences, and the lossless retrieval of such encoded information. Also taught are a system and method for non-replicative information data set encryption utilizing rule-based, synthetic gene sequences wherein information extraneous to the data set, such as encryption keys, may be embedded within the synthetic gene sequence, providing the lossless retrieval of the original, unencrypted information.

55 Claims, 14 Drawing Sheets

Pseudo Code of Subroutine "EXPAND"

define global  *dx[]*  ! *Temporary gene array*
    *exp_rslt[]*  ! *Temporary array of expanded results*
    *md*  ! *Modulo operator's divisor* procedure  EXPAND ( $t, x, d, n$ )
  use  $t$ = *the number of genes to expand*
    $x$ = *the last calculated data*
    $d$ = *gene array element counter*
    $n$ = *size of the resulting expanded array*
  define  $m$ = *next calculated data* if  $d < 0$
    $d = d + t$ if  $d > 0$
    $d = d - t$ $m = x + dx[d]$ $exp\_rslt[n] = (m \% md) + 1$ if ( $n > 0$ )
    EXPAND( $t, m, d+1, n-1$ )
  if ( $n > 0$ )
    EXPAND( $t, m, d-1, n-1$ )

FIG. 3

Detail of Chromosome Expansion and Fitness Evaluation for the "Magic Square" Problem

Macro Instruction Details for Placement and Configuration Of the Outer Cube

| Coordinate Data For Outer Cube | Side Wall Colors For Outer Cube | Color Data for Outer Cube | Orientation of Outer Cube's Faces |
|---|---|---|---|
| x y z | x y z | x y z | |
| 1 0 0 | 0 1 1 | 1 0 1 | 0 1 2 3 |
| 0 1 0 | 1 1 0 | 1 1 0 | 3 2 5 4 |
| 1 1 0 | 1 0 0 | 1 0 0 | 4 5 7 6 |
| 1 0 0 | 1 1 0 | 0 1 0 | 6 4 3 0 |
| 1 0 1 | 1 1 1 | 0 0 1 | 0 7 6 1 |
| 1 1 1 | 1 0 1 | 0 1 1 | |
| 0 0 1 | | | |
| 0 1 1 | | | |

FIG. 7a

Macro Instruction Details for Placement and Configuration of the Four Inner Cubes, Including Color and Face Information

OFF 72 48 0

Pseudo Code of Subroutine "GEOMGROW"

define global  $dx[]$  ! Temporary gene array
  $state\_model[]$ ! Temporary expanded state model
  $md$ ! Modulo operator's divisor
  $cnt$ ! State model element counter procedure GEOMGROW ( $t, x, d, n$ )
  use $t$ = the number of genes to expand
   $x$ = the last calculated data
   $d$ = gene array element counter
   $n$ = size of resulting state model (in number of states)
  define $m$ = next calculated data if $d < 0$
   $d = d + t$ if $d > 0$
   $d = d - t$ $m = x + dx[ d ]$ $state\_model[ cnt ] = m \% md$
  $cnt = cnt + 1$
  $state\_model[ cnt ] = m \% 2$
  $cnt = cnt + 1$ if ( $cnt < n*2$ )
   GEOMGROW( $t, m, d+1, n-1$ )
  if ( $cnt < n*2$ )
   GEOMGROW( $t, m, d-1, n-1$ )

FIG. 8

**Encoded Synthetic Genes Derived
From the "Cubes within a Cube"
Model Parameters**

| A | B | C | D | E | F | G | H | I |
|---|---|---|---|---|---|---|---|---|
| 248 | 63 | 84 | 23 | 123 | 567 | 837 | 231 | 23 |
| 786 | 30 | 37 | 76 | 639 | 121 | 876 | 548 | 234 |
| 628 | 66 | 36 | 18 | 714 | 124 | 758 | 312 | 901 |
| 867 | 78 | 70 | 54 | 314 | 612 | 317 | 721 | 42 |

Legend:

- *A)*    *Outer Cube Coordinate Genes*
- *B)*    *Outer Cube Face Information Genes*
- *C)*    *Outer Cube Color Genes*
- *D)*    *Outer Cube Shading Genes*
- *E)*    *Number of Inner Cubes Genes*
- *F)*    *Inner Cube Coordinate Genes*
- *G)*    *Inner Cube Face Information Genes*
- *H)*    *Inner Cube Color Genes*
- *I)*    *Inner Cube Shading Genes*

FIG. 9

Overview of Information Encryption
Using Synthetic Genes
The phrase .....
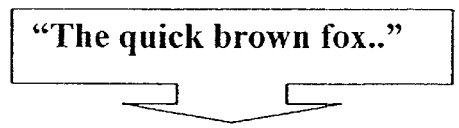
"The quick brown fox.."
... is decomposed into data subsets ...
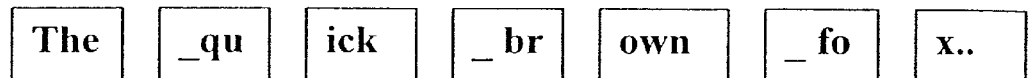
The | _qu | ick | _br | own | _fo | x..
... against which a population of trial genes
and any encryption key(s) will be
transformed into combined numerical
quantities representing possible matches
to the individual characters in the data
subset.
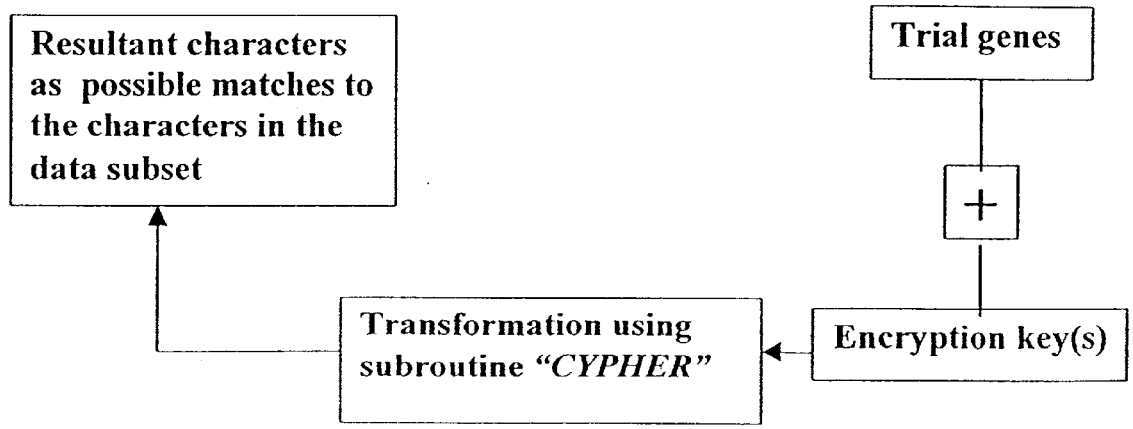
FIG. 10

Pseudo Code of Subroutine "CYPHER"

```
define global  dx[]   ! Temporary gene array
               ptype[] ! Temporary transformation array
               cnt   ! Transformation array element counter procedure  CYPHER ( t, x, d, n, k )
     use   t = the number of genes to use in the transformation
           x = the last calculated data
           d = gene array element counter
           n = number of characters in data subset to be encrypted
           k = last calculated key
  define   m = next calculated data
           nk = next calculated key if  d < 0
         d = d + t if  d > 0
         d = d - t m = x + dx[ d ]
  nk = k + dx[d]

ptype[ cnt ] = (m + nk) % 255
  cnt = cnt + 1 if ( cnt < n)
      CYPHER( t, m, d+1, n-1, nk)
  if ( cnt < n)
      CYPHER( t, m, d -1, n-1, nk)
```

FIG. 12

Encoded Synthetic Genes Representing Two Separate Instances of Encrypting the Phrase "Fall not from grace" with the Encryption 'secret'

First Encryption 616539 451368 515496 358429 800375 563536 718590 963097 708952 798570 785387
284453 764620 645332 368073 661418 294305 495216 199083 355853 616450 43094
191849 966414 689827 108996 927058 412454 192686 7442 888019 555901 812524
383668 290611

Second Encryption 526014 793323 177111 408298 850090 297316 718080 6847 700566 961714 947822
497123 726115 584862 547000 818753 138755 830031 636170 440644 417805 679829
208169 748919 450612 256386 892123 128639 428681 354157 575644 776731 803599
719367 186567

FIG. 13

INFORMATION ENCODING AND RETRIEVAL THROUGH SYNTHETIC GENES

RELATED APPLICATIONS

This application claims the benefit under 35 USC 119(e) of U.S. provisional application Ser. No. 60/099,713, filed Sep. 10, 1998 and entitled Information Encoding and Retrieval Through Synthetic Genes, which is herein incorporated by reference.

BACKGROUND OF THE INVENTION

1. Technical Field

This invention generally relates to genetic algorithms, information encoding and information encryption. Specifically, this invention relates to the structure of genetic algorithms and how that structure can be made to more accurately parallel the natural genetic paradigm; the structure of complex data set encoding, in particular, digitally volume rendered data sets; and absolute secure information encryption methods. The invention is particularly applicable to the range of problems wherein a more natural genetic-like implementation of the conventional genetic algorithm, the increased efficiency of information encoding in the form of synthetic genes and/or encryption of information utilizing synthetic genes may be found as a solution to these problems.

2. Background

Genetic algorithms have been used for decades for solving problems in many fields of research, development and implementation, most notably, the sciences and engineering. A central appeal of genetic algorithms has been the notion of novel solutions to otherwise intractable problems. For many of the same reasons that great fascination and often amazement exists for natural biological genetics, researchers have often found unique and unexpected solutions to various problem sets through the use of genetic algorithms.

In large part, genetic algorithms possess their power and effectiveness precisely because they mimic a process that, by the reckoning of current science, has been replaying itself successfully for billions of years.

Therefor, it would be desirable to provide a higher degree of transcription of natural genetic principles and apply this to the field of genetic algorithms.

As technological advances create increased opportunities for data utilization and visualization, so too are there increased strains on the prior art of encoding and retrieving such information. In particular, the field of three dimensionally viewed objects and their manipulation in digital environments have become increasingly important in medicine, education and science. Virtual reality is fast becoming an accepted, and in some cases the only, means of achieving effective communication, education and simulation. Unfortunately, information current methods of information encoding are largely inefficient and cumbersome.

Therefor, it would be desirable to provide more efficient and compact method of information encoding.

Because of exponentially increasing digital traffic, both on and off the internet, the need for totally secure forms of information exchange has become paramount. With the advent of ever more powerful computers available to almost everyone, computing intensive algorithms for data encryption, as well as the decoding of such encryption, have now become practically feasible.

The rapid rise of technical tools, more common place expertise, and the sheer power of readily available computers have spawned a new class of users whose motives are not always honorable. "Code cracking" and computer "hacking" in general have become new avenues for entertainment, achievement and criminal activity. To date, very few, if any, absolutely secure information encyrption algorithms exist.

Genetic algorithms are generally parallel processes that develop populations of individual data objects, usually developing binary character strings into new populations of the same data type, using methods that mimic biological genetics, such as recombination, or crossover, and a proportional reproductive schema based on the notion of Darwin's survival of the fittest. Such algorithms start with some initial population of data objects, usually created in some pseudo random fashion. These data objects are then evaluated iteratively for fitness as it pertains to the problem at hand and genetic like operations are performed on various data objects within the population to evolve a new population.

John Holland of the University of Michigan developed the initial concept of genetic algorithms for fixed-length binary character strings in Adaptation in Artificial and Natural Systems, by Professor John H. Holland, 1975. Subsequent and significant works in genetic algorithms and genetic classifier systems may be referenced in Grefenstette, Proceedings of the Second International Conference on Genetic Algorithms, 1987; M. Srinivas, et al., "Genetic Algorithms: A Survey", Computer, vol. 27, No. 6, pages 17–26, Jun. 1994; Goldberg, Genetic Algorithms, pages 10–20, 80–139, Addison Wesley 1989; W. B. Dress, "Darwinian Optimization of Synthetic Neural Systems", IEEE First International Conference on Neural Networks, San Diego, Jun. 1987, vol. No. 3, pages 769–775; Schaffer et al., An Adaptive Crossover Distribution Mechanism for Genetic Algorithms, Proceedings of the $2^{nd}$ International Conference on Genetic Algorithms, Jul. 28–31, 1987, pages 36–40; and Melanie Mitchell, "An Introduction to Genetic Algorithms", pages 87–113, MIT Press 1996.

Several improvements have been made to Holland's basic premise over the ensuing years, but none has addressed the lack of parallelism between these genetic algorithms and their natural genetic paradigm, namely that in conventional genetic algorithms, sexual-like recombination or crossover, regardless of its geometry or relative sophistication, occurs on a population member or data object only in its final form, that is its phenotypical form. This is the biological equivalent, for example, of grafting the legs of a very fast runner onto the body of a person having great upper body strength in order to achieve some environmental fitness objective.

Indeed, all efforts toward improvements in genetic algorithms have been made on the same plane. That is to say, the prior art procedures of crossover and fitness selection in genetic algorithms, regardless of their variations, are performed on the same level of member development, without regard for the complexities surrounding the integrated behavior of the genomic regulatory systems underlying ontogeny, or in other words, the unfolding of events involved in an organism changing gradually from a simple to a more complex level.

In reality, biological sexual recombination occurs at the genotypical level, where the genotype is a group of organisms sharing a specific genetic constitution. The phenotype, the constitution of an organism as determined by the interaction of its genetic constitution and the environment, is the phase in the overall scheme of things where natural selection occurs.

In fact, the two procedures, biological crossover or sexual recombination and fitness selection, occur not only at very different levels but on an incredibly different scale.

"It has been estimated that the sperm that fertilized all the eggs from which the present human population of the world developed could be packed into a container smaller than an eraser on a pencil . . . the biologically inherited qualities of human beings—the similarities as well as the differences that distinguish one human from another and from all other living things—have their basis in a minute mass of sperm . . . ". Adrian M. Srb, "General Genetics", pages 2–26, 265–284., W. H. Freeman and Company 1965.

Volume rendering is a computer graphics technique whereby the object or phenomenon of interest is sampled or subdivided into many cubic building blocks, called voxels, or volume elements. A voxel is the three dimensional (hereafter 3-D) counterpart of the two dimensional (hereafter 2-D) pixel and is a measure of unit volume. Each voxel carries one or more values for some measured or calculated property of the volume and is typically represented by a unit cube. The 3-D voxel sets are assembled from multiple 2-D images, and are displayed by projecting these images into 2-D pixel space where they are stored in a frame buffer. Volumes rendered in this manner have been likened to a translucent suspension of particles in 3-D space.

In surface rendering, the volumetric data must first be converted into geometric primitives, by a process such as isosurfacing, isocontouring, surface extraction or border following. These primitives, such as polygon meshes or contours, are then rendered for display using conventional geometric rendering techniques. Both techniques have advantages and pitfalls.

A major advantage of the volume rendering technique is that the 3-D volume can be displayed without any knowledge of the geometry of the data set and hence without intermediate conversion to a surface representation. This conversion step in surface rendering can sometimes be quite complex, especially if surfaces are not well defined, e.g. noisy 2-D images, and can require a lot of user intervention, such as manual contour tracing.

On the other hand, because the 3-D data set is reduced to a set of geometric primitives in surface rendering, this can result in a significant reduction in the amount of data to be stored, and can provide fast display and manipulation of the 3-D reconstructions produced by this method.

By contrast, since all of the image stack data is used for volume rendering, computers with lots of memory and processing power are required to handle volumes rendered in this manner. Because the entire data set is preserved in volume rendering, any part, including internal structures and details, which may be lost when reducing to geometric structures with surface rendering, may be viewed.

Since most applications of interest wish to preserve the internal structures and details resulting from volume rendering, but would desire to perform more efficiently, particularly with massive amounts of data, as in the case of surface rendering, it would be highly desirable to provide a technique that achieved the advantages of both methods, that is, the speed of surface rendering with the detail of volume rendering.

The prior art of data encryption is at least two thousand years old and the entire field of cryptology has evolved to a very high degree of specialization. The most commonly used methods employ a "key" or system of keys. A key may be a binary equivalent of a phrase, e.g.- "the quick brown fox". This binary number is in turn used to encrypt an information data set. As a general rule, the longer the binary number, the more difficult it is to break into an encrypted message. Thus, so-called "strong" encryption algorithms might use a 128 bit method in contrast to a more standard 40 bit method. One form of early key-encryption algorithms was the "symmetric" key approach. Symmetric key encryption methods require that both the sender and receiver of encrypted messages have access to the same key and that same key is used to both encrypt and decrypt, thus, "symmetric". Such systems assume that those communicating have an alternative means of secure communication, otherwise there could be no means of agreement on what key(s) to use.

In 1976, Whiffield Diffie and Martin Hellman at Stanford University, proposed the "public key" encryption system. The system was soon named "RSA". A user's RSA software generates a pair of keys. Each is a large integer, sometimes more than 500 digits. The two keys are mathematically related. Either key can be input into certain software to encrypt a message, and the other key can be input later to decrypt the same message. That is, encrypt with one key and decrypt with another. In practice, however, RSA encryption is used more as a security "envelope". Thus, what is transmitted is a message encrypted with a symmetric key and a copy of the key used, wrapped in the RSA envelope. At the receiving end, the decryption software first unwraps the RSA envelope, obtains the symmetric key and uses that key to decode the message.

In any event the same encryption will result in each instance that the same key is used on the same information data set. That is, the process can be replicated.

Regardless of the type of key system used, symmetric, public etc., the replication is ultimately the vulnerable aspect of the prior art of information encryption.

Therefor, it would be desirable to provide an improved method for absolutely secure information encryption that can not be replicated.

SUMMARY OF THE INVENTION

The invention uses biological genetics as a metaphor to achieve a greater parallel with the natural genetic paradigm by incorporating synthetic genes into the genetic algorithmic process. Employing synthetic genes within the structure of computer readable memory provides increased flexibility and power to genetic algorithms, allows for efficient and compact information encoding, provides secure information encryption, and provides a problem solving tool which can be applied to a large number of very diverse problems.

Another embodiment of the invention provides a method and system for nonlinear encoding of ordered information data sets employing synthetic genes.

Yet another embodiment of the invention provides a method and system for highly nonlinear information encryption using synthetic genes which is completely non-replicative.

Additional advantages and novel features of the invention will be set forth in part in the description that follows, and in part will become apparent to those skilled in the art upon examination of the following or may be learned by practice of the invention.

BRIEF DESCRIPTION OF THE DRAWINGS

FIG. 3 is a pseudo code listing of a recursive subroutine used in an example problem employing synthetic genes in genetic algorithms;

FIG. 7a is a table of detailed macro parameters used to produce the outer cube in the example encoding problem;

FIG. 7b is a table of detailed macro instructions used to display the four inner cubes in the example encoding problem;

FIG. 8 is a pseudo code listing for a recursive subroutine used in the example "Cubes within a Cube" problem according to one embodiment of the invention;

FIG. 9 is a table and description of encoded synthetic genes for the "Cubes within a Cube" problem;

FIG. 10 is an overview of information encryption using synthetic genes according to one embodiment of the invention;

FIG. 12 is a pseudo listing of a recursive subroutine used in the message encryption example; and FIG. 13 is a table showing two instances of encryption of the same message resulting in different sets of synthetic genes.

DETAILED DESCRIPTION OF THE INVENTION

Referring now to the figures, the use and implementation of synthetic genes and computer-readable memory structures will be more fully described. Additionally, procedures for the creation, storing and manipulation of synthetic chromosomes and their synthetic genes will be more fully described. Finally, the construction of phenotypical structures containing the encoded parameters or other aspects of physical problem sets as derived from the base information contained within the synthetic chromosomes and component synthetic genes will be more fully described.

While it is true that biological chromosomes and the genes which they comprise have evolved in a relatively 'unsophisticated' gene to gene relationship over billions of years, particularly when viewed from a linear mathematical perspective, it is nonetheless impressive, to say the least, that so complex an organ as the human eye, for example, has come into existence at all. Indeed, the sheer power of biological evolution stems from "genetic systems containing thousands of genes whose products turn one another on and off. It is the integrated dynamical behavior of this regulatory system which coordinates the expression of different genes in each cell type of the organism and underlies the orderly unfolding of ontogeny." Stuart A. Kauffman, "The Origins of Order", pages 441–442, Oxford University Press, Inc. 1993. Thus, from a simplified view, the force of biological evolution appears to be derived from the constant cycling between fitness evaluation at the organism's developed level and reproduction, or crossover, at its genetic level.

Figure 1:
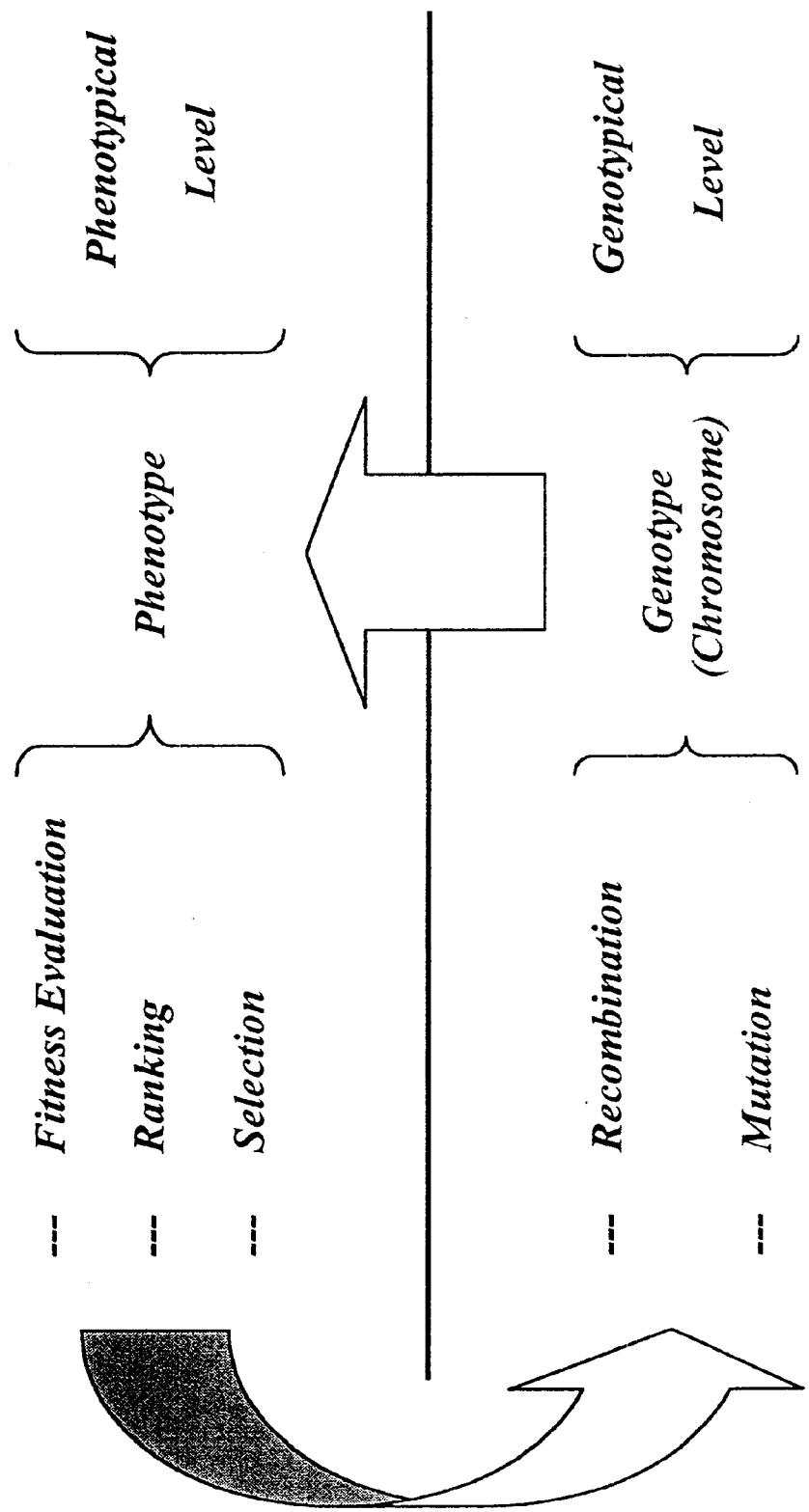
FIG. 1 is an overview of the distinction between the genotypical and phenotypical planes on which the disclosed invention operates in executing genetic algorithms.

FIG. 1 shows the two main levels on which one embodiment of the invention for genetic algorithms operates. The fitness selection process in the upper phenotypical level dictates which synthetic genes ultimately take place in the recombination, or crossover, and possible mutation processes in the lower genotypical level.

Figure 2:
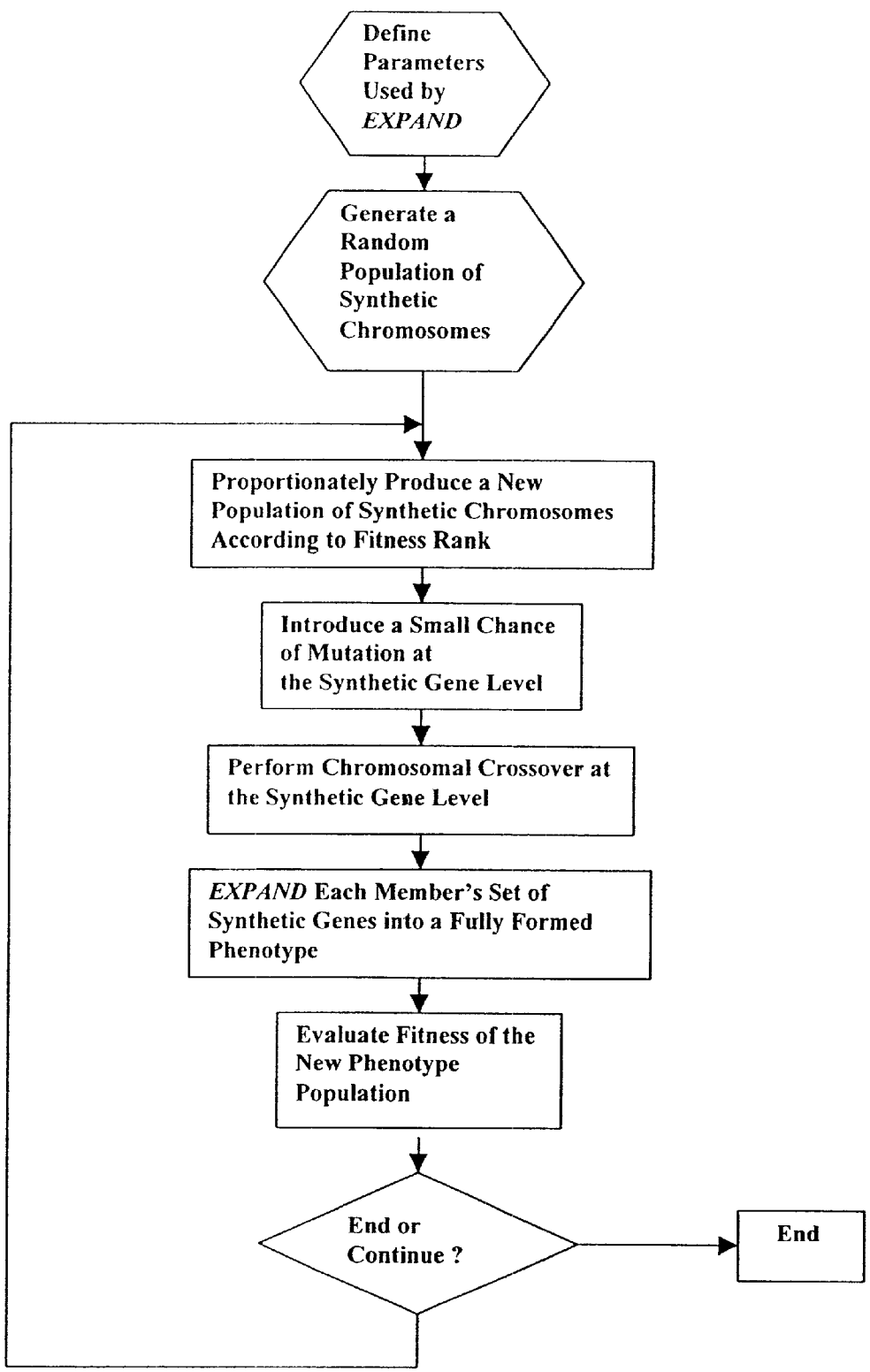
FIG. 2 is a flow diagram of a generalized method for implementing the invention in genetic algorithms.

An overview of using synthetic genes and chromosomes within the genetic algorithm is shown schematically in the flow diagram of FIG. 2. In the first step, global assignments are made that will be used by the expansion subroutine, EXPAND, as required by a given problem's parameters. These may include divisor maxima for the modulo operators, the number of genes in each chromosome, the size of the final phenotypical entity, and the individual population member whose final characteristics will be evaluated in the objective function.

The next step consists of generating the entire population of synthetic chromosomes, made up of individual synthetic genes. This step may be, and usually is, done in a pseudo random fashion.

The succeeding steps are done iteratively until some objective is reached. They consist of: proportionately producing offspring, e.g. synthetic chromosomal crossover, according to rank until the entire population is replaced; introducing a small chanced mutation; expanding each member's set of genes into a fully formed phenotypical entity, or problem solution candidate; and ranking the results of the entire phenotypical population according to their match against some target or objective function.

In the example presented below, the objective function is a solution to the so-called "Magic Square" problem, in this case, a four by four cellular matrix having one of the integers 1 through 16 in each cell and arranged in such a way that the sums of the individual cells in each row, column and diagonal are equal.

In natural genetics and ontology,". . . the chromosomal and point mutations are continuously 'scrambling' the 'wiring diagram' and the 'logic' of the regulatory system". Stuart A. Kauffman, "The Origins of Order", pages 411–439, Oxford University Press, Inc. 1993. Furthermore, the developmental process is highly recursive and in fact far more parallel than the von Neumann architecture that slants the view of the way in which the "genetic code" is perceived to be executed.

FIG. 3 shows the pseudo code of a simple subroutine that can be used to expand a synthetic chromosome into a fully developed population member having sufficient structure to potentially solve the example problem. Since it is a recursive call, global arrays, "dx[]", a temporary vector to be assigned the current population member's synthetic chromosome's genes and "exp_rsit[]", a temporary array of expanded results, i. e. fully developed phenotypical population member, as well as the modulo operator's divisor, "md", are defined elsewhere.

In pseudo code form, the prototype of the call is EXPAND (t, x, d, n), where:

t =the number of genes to expand;

x =the last calculated datum (initially zero);

d =gene array element counter (i. e. —chromosome locus) (initially zero); and n =size of the resulting population member (i.e. in this the linear length of the coded, fully developed population member).

Because in practice, most fully developed, or expanded, population members are significantly larger in length than their corresponding synthetic chromosomes, the gene array counter, i.e. the chromosome locus, is first checked for being out of range of the chromosome loci. For instance, if d<0, then t is added to the existing value of d, i.e. d=d+t. If d>t, then t is subtracted from the existing value of d, i.e. d=d−t.

Having established that the chromosome's locus is in the appropriate range, the next step is to add the value of the chromosome's current locus, i.e. gene array element "d" to the last calculated, i.e. "passed", value "x", resulting in "m", a temporarily defined local variable within the subroutine. The modulo operator then determines the remainder of "m" less multiples of its divisor "md". Since, in this particular example, gene values were pseudo randomly assigned values between 0 and 999, a fair amount of variability is assured. A 1 must be added to the result because the base number is 0 and our coding requirement of possible values is the range 1–16.

Finally, a check is made for termination of the recursive call if the $0^{th}$ element has been reached, otherwise, another call is made (to itself) until such condition is met.

Figure 4:
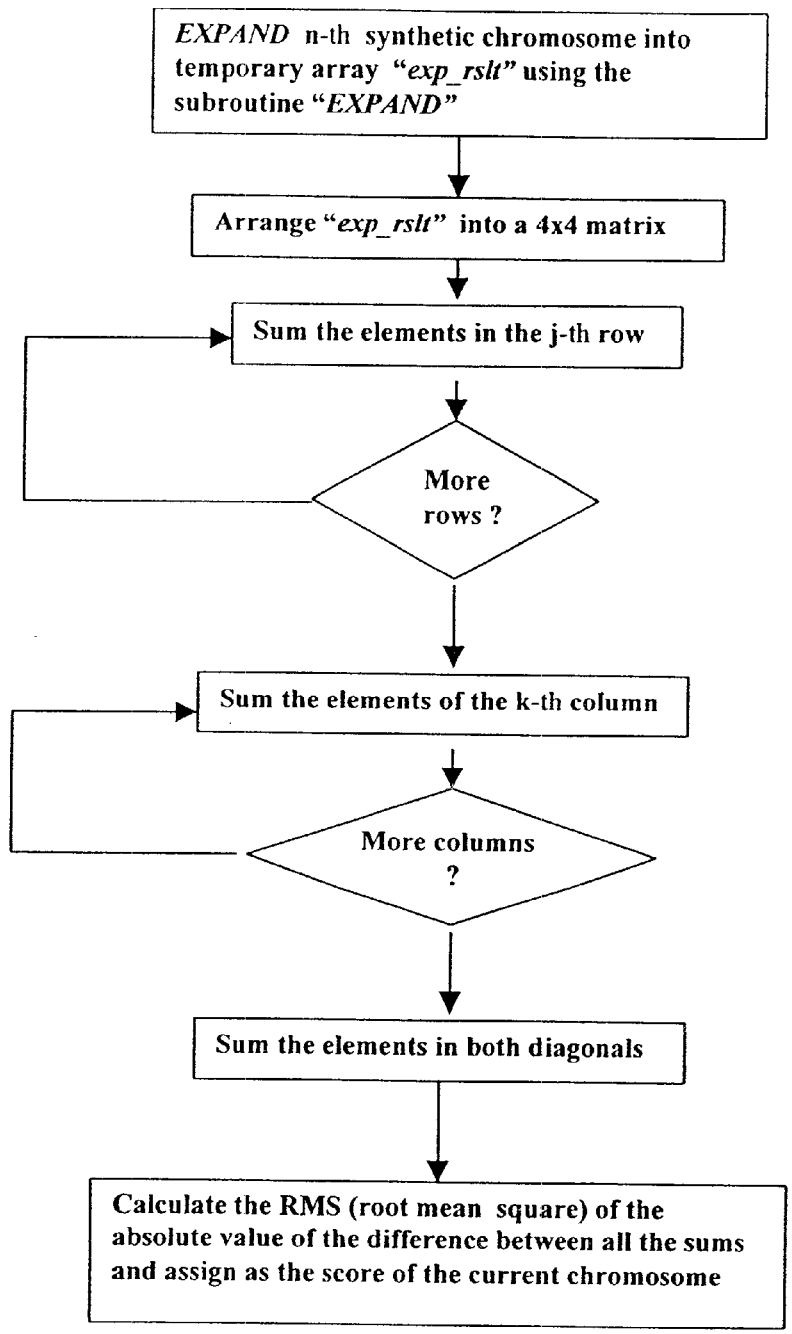
FIG. 4 is a flow diagram of synthetic chromosome expansion and fitness evaluation of the example "Magic Square" problem to be solved by one embodiment of the invention.

FIG. 4 shows a detail flow diagram of the chromosomal expansion and fitness evaluation for the resulting phenotype in the "Magic Square" problem.

Perhaps one of the more important aspects of synthetic genes is the ability to perform highly compressed and ordered encoding of an information data set. As discussed above in the Background section relating to volume rendered data, one of the advantages of surface rendered data is the speed of rendering because the Cartesian coordinates are known, whereas volume rendered data are not geometrically specific and can store, using voxels, detailed information about the inside structure of an object, albeit often at great costs in terms of storage and computational overhead. The relative speed and storage advantage of the surface rendering approach is achieved because there is no information that is stored regarding the internal structure of an object in 3D space.

One embodiment of the invention offers a method and system to achieve the advantages of volume rendered, voxel like information stored in the spirit and efficiency of the surface rendering approach.

Figure 5:
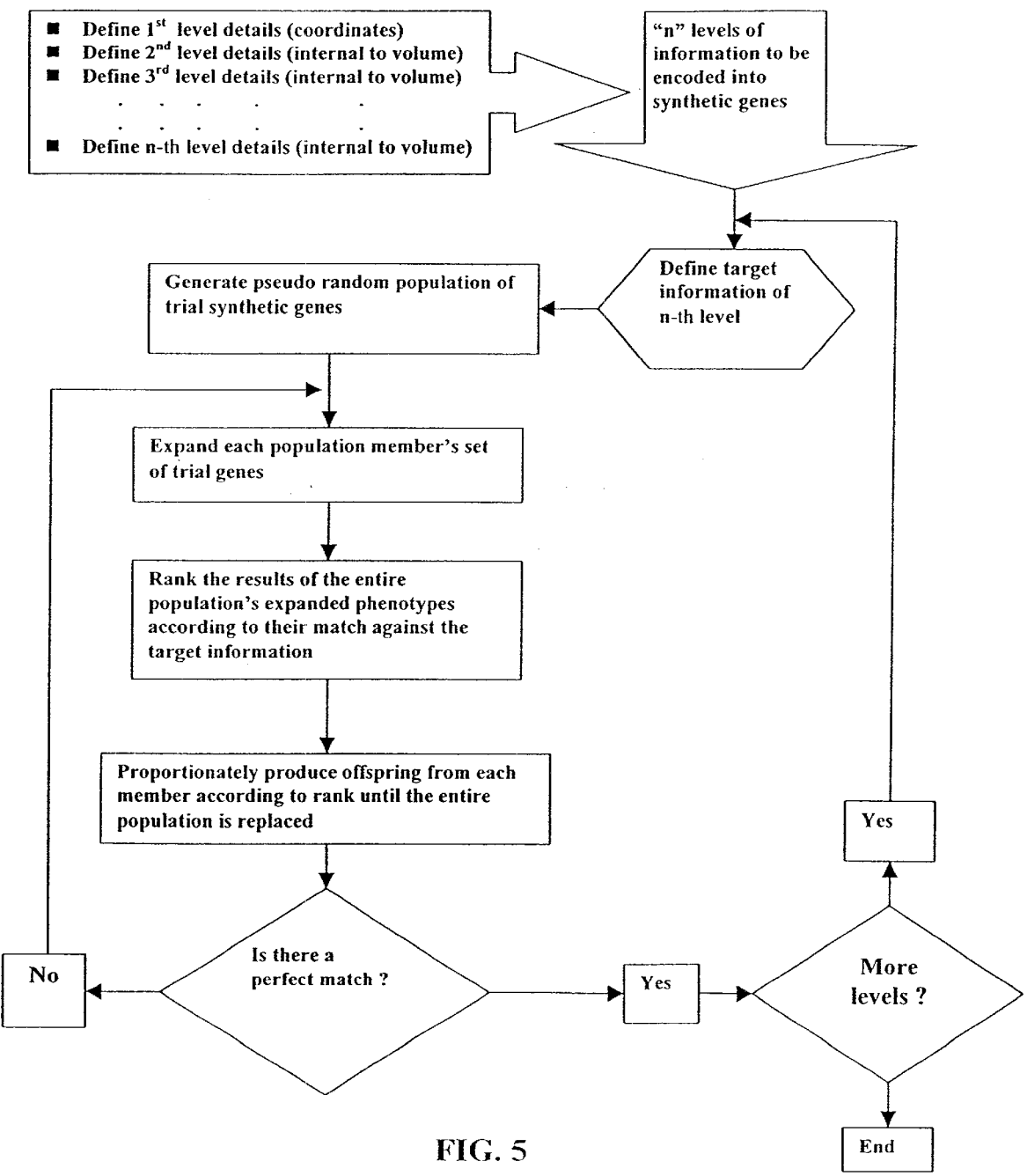
FIG. 5 is a flow diagram of the generalized procedure used in encoding volumetric information using synthetic genes.

FIG. 5 is an overview of the synthetic gene encoding process as it may concern a simple volumetric shape, complete with internal details.

Figure 6:
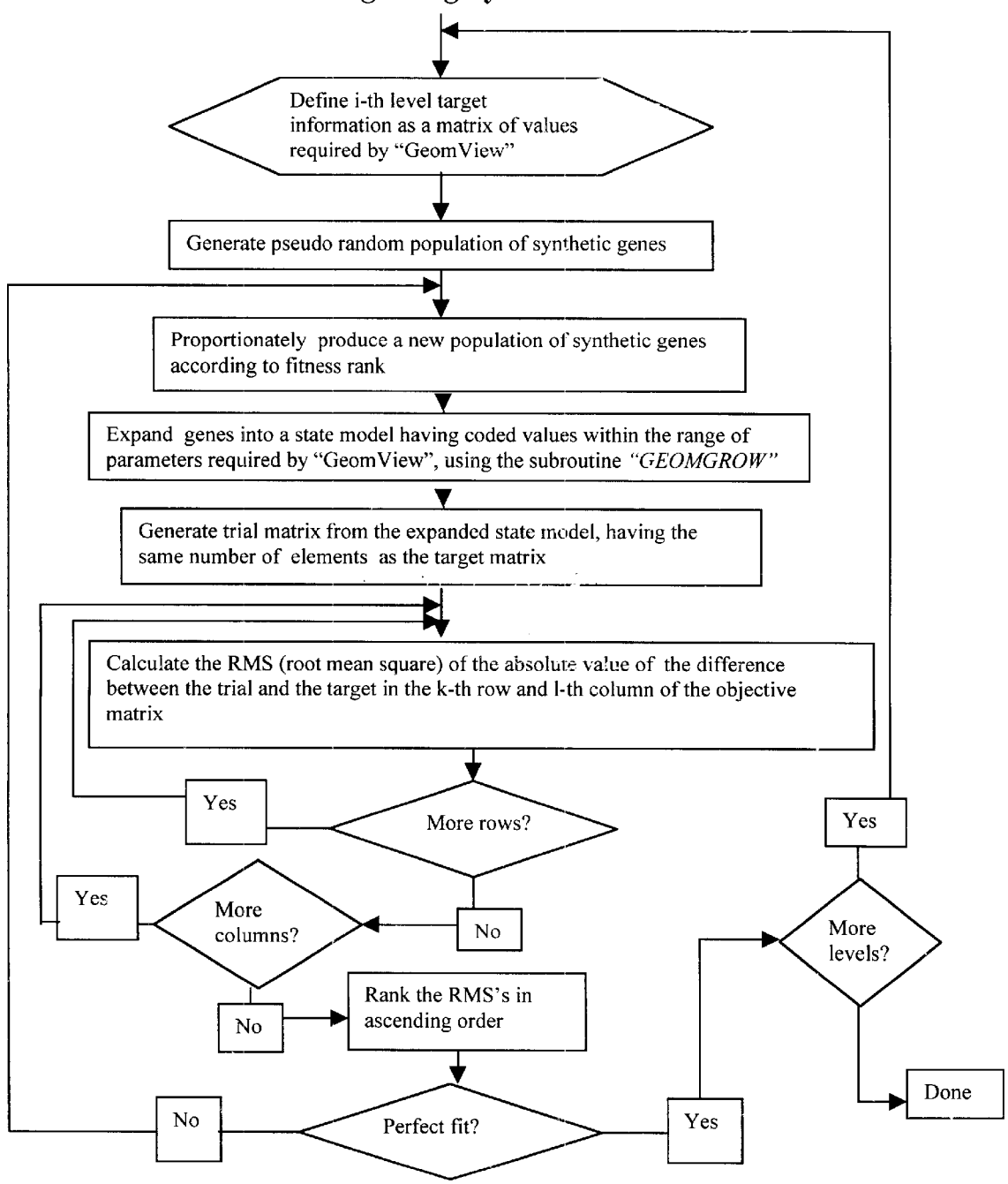
FIG. 6 is a flow diagram of the example "Cubes within a Cube" encoding problem using synthetic genes according to one embodiment of the invention.

FIG. 6 shows a flow diagram of a process for encoding a simple set of data used to generate a 3D cube having four smaller cubes positioned equidistantly within it, of different colors, shades and face information.

Figure 7B:
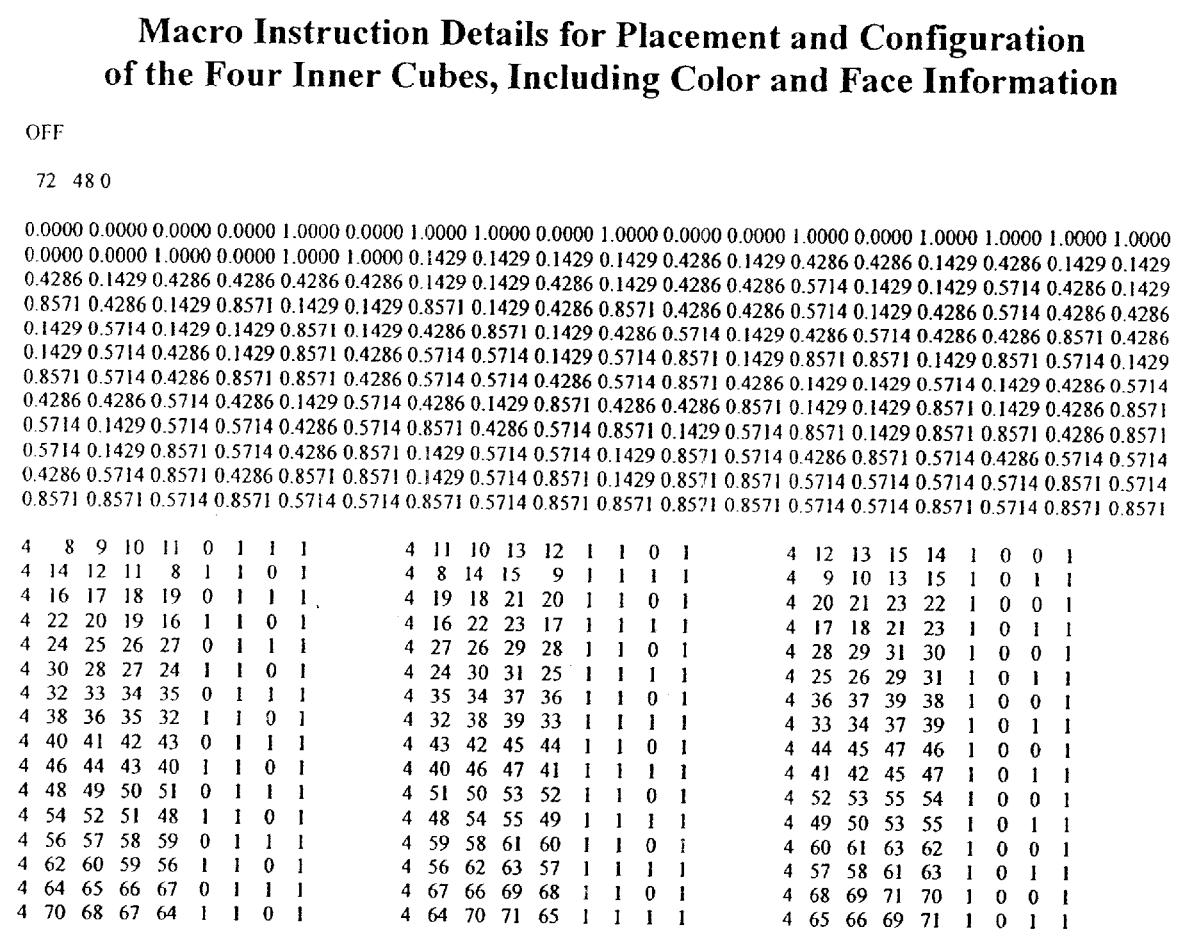

FIG. 7a and FIG. 7b are tables showing the different levels of actual data used as macro specifications in the example below and which was implemented using "Geomview", a 3D visualization software environment developed by the University of Minnesota. FIG. 7a and FIG. 7b are an amplification of the first step in FIG. 6, "Define Target Information".

Each data set is considered a level for transformation within the overall process. It begins with the coordinate parameters for the outside cube and all subsequent levels of transformation are subordinate to those coordinates.

The second step in FIG. 6 is the generation of a pseudo random population of synthetic chromosomes. In this particular example, a population of 1,500,000 synthetic chromosomes were thus created, each having four synthetic genes with numeric values ranging between 1–999.

FIG. 8 is a pseudo code listing showing the third step in FIG. 6 and the first part of the iterated loop where the actual transformation takes place. It describes the expansion of an individual synthetic chromosome into a state model such that, when it is "stepped through" or executed, a trial matrix of encoded parameters will be generated within the range of values as passed to the recursive subroutine "GEOM-GROW".

Each such constructed, i.e. expanded, trial matrix is compared to the target data defined initially in the procedure and ranked in order of ascending differences.

The next part of the iteration performs the synthetic chromosomal crossover in a quantity proportionately scaled to the ranking of the respective, expanded, state models, wherein a slight chance of mutation on a synthetic gene is made possible within the code.

The iteration process continues until a perfect match is achieved for the current level of target data. The entire process is repeated until all levels of target data have so transformed.

Thus, in this example, each level of complexity of the overall volumetric quantity will have its own set of four synthetic genes, beginning with the coordinate genes for the outer cube, the definitional characteristics of the outer cube and then proceeding to the inner cubes, their definitional characteristics and so on.

FIG. 9 shows the actual set of synthetic genes generated by this method. It is interesting to compare FIG. 7a and FIG. 7b with FIG. 9 and note the difference in scale while still allowing a faithful transcription of the synthetic genes therein to the final volumetric form.

FIG. 10 is an overview of a process of encrypting data through the use of synthetic genes. An advantage of the invention as it relates to data encryption is the fact that it is extremely unlikely that any two sets of synthetic genes representing the exact same data set will be the same. That is, the process is non-replicative. In other words, the same data set encrypted in separate instances by the invention will almost never result in identical sets of synthetic genes. In fact, the chance of such an occurrence is roughly the repeatability rate of most present day pseudo random number generators, usually around three times 10 raised to the $38^{th}$ power.

Another feature of the disclosed method allows a variety of avenues for utilizing encryption "keys", or other information extraneous to the information data set, in such a way as to be imbedded into the encoded synthetic gene structure. Such encryption keys may follow more standard usage of symmetric and/or public keys, as discussed in the Background section relating to data encryption above, or may be employed in more novel ways. Because of its highly non-linear encoding scheme, this method of encryption leaves open the possibility of more and varied forms of "key-like" information, including indexed keys, key-per-character and compound keys, than currently exist in the prior art.

Figure 11:
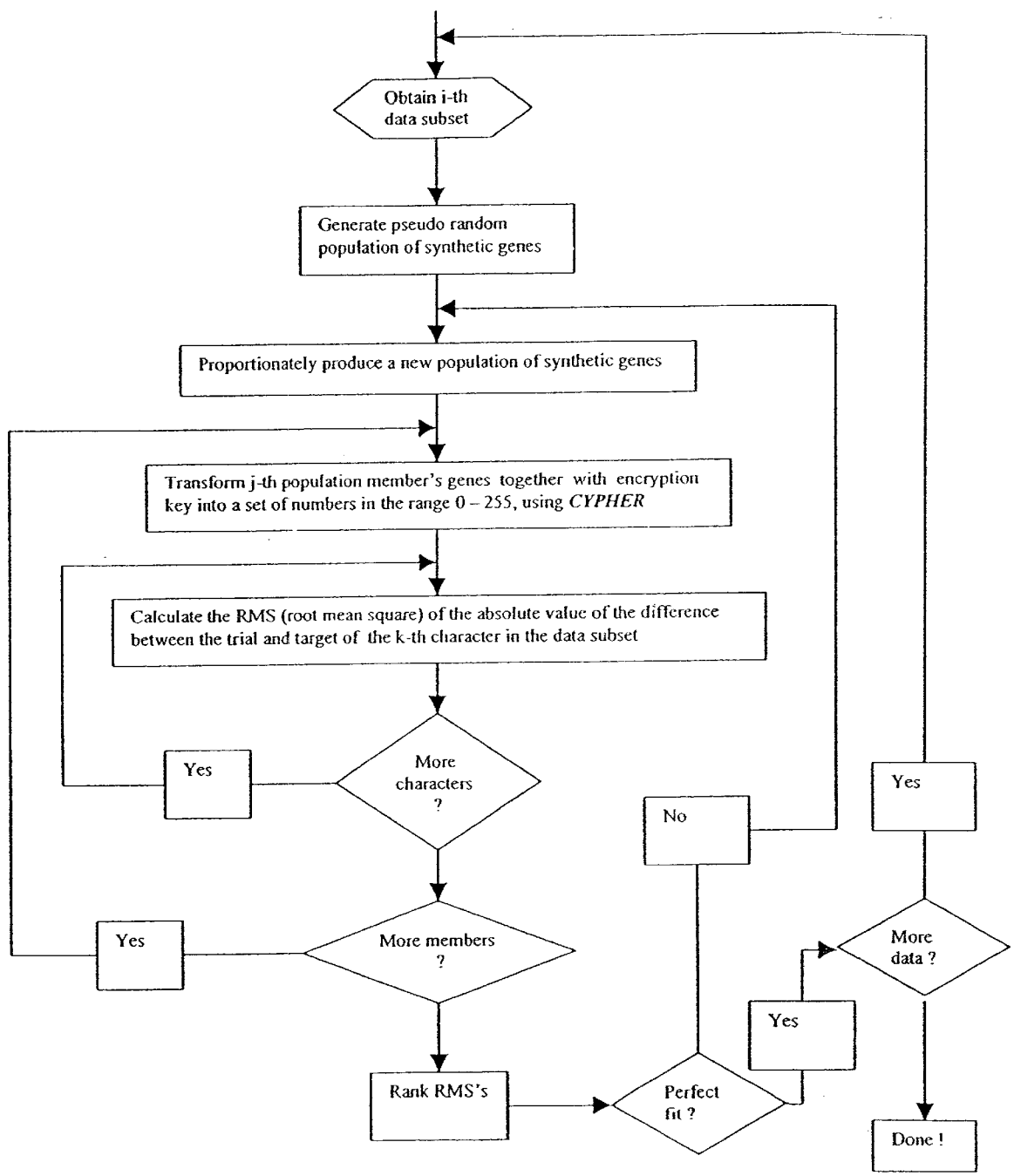
FIG. 11 is a flow diagram of an example of a message encryption using synthetic genes according to one embodiment of the invention.

FIG. 11 is a flow diagram of an example encryption process using synthetic genes. The example encryption further illustrates a method of embedding an encryption key within the synthetic genes thus generated from the information data set. In a general sense, the procedure is a fitness selection process wherein possible exact matches to a particular data subset are generated by a series of recursive calls to the subroutine CYPHER.

The phrase "Fall not from grace" is to be encrypted using a single encryption key 'secret'. In this example, the phrase is decomposed into data subsets of three characters, ("Fa), (ll), (not), and so on. The encryption key 'secret' is converted into a numerical quantity and is an argument in the subroutine CYPHER, described below, for each initial call to a particular data subset.

FIG. 12 is a pseudo code listing describing the subroutine CYPHER used in the example encryption. The global gene array "dx[]" is defined ahead of the procedure CYPHER and contains the trial genes used in the transformation process. "ptype[]" is also defined globally and will contain the resulting transformed data having values of 0 through 255. "cnt" is a globally defined counter for "ptype[]" and terminating quantity for CYPHER. The purpose of CYPHER is to transform a series of numeric synthetic genes and any encryption key(s) into a series of numeric quantities falling within the ASCII range of 0 through 255, which represents the range of printable characters on standard U.S. keyboards. Different ranges can be employed by simply changing the modulo operator divisor.

Any encryption key information is initially passed to CYPHER as an argument in its call and becomes enmeshed in the resulting transformation as its original value becomes recursively modified each time a call to CYPHER is made to itself. That is, synthetic gene and encryption key values are operated on as a sum by modulo 255 to produce a potential solution to the numeric ASCII character equivalent of the target data.

In this particular example, the encryption key, "secret", is converted into a numerical quantity representing the sum of the numeric equivalents of each of its ASCII characters. This numeric key value is initially passed to CYPHER for each data subset of the decomposed phrase representing the information data set. In subsequent calls of CYPHER to itself, previously modified values of "x", initially 0, as represented by "m", as well as modified values of "k", initially the encryption key, as represented by "nk", are both passed back in their modified form to be further modified, i.e. a modification of a previous modification, and so on.

FIG. 13 shows the encoded synthetic genes from two separate instances of encrypting the phrase "Fall not from grace" with the encryption key 'secret'. It shows that the invention produced two totally different sets of synthetic genes, each representing exactly the same information data set and encryption key. Each set of synthetic genes can be decrypted back into the exact same phrase, "Fall not from grace", provided that the encryption key, "secret", is used.

While there is shown and described certain embodiments of the invention, it is to be distinctly understood that this invention is not limited thereto but may be variously embodied to practice within the scope of the following claims.

I claim:

1. A method for encrypting a data set comprising the steps of generating a population of synthetic genes, and transforming the data set and the synthetic genes together with an encryption key to generate a synthetic gene sequence as the end product, such that said synthetic gene sequence, when expanded produces an exact replica of the original data set.

2. The method of claim 1 including the stop of defining a set of rules by which a given synthetic gene sequence is expanded so as to produce an exact replica of a particular data set.

3. The method of claim 2 further comprising an act of retrieving the original data by expanding the synthetic gene sequence.

4. The method of claim 3 wherein information extraneous to said data set is retrieved from the synthetic gene sequence produced by including extraneous information in the data set and defining rules for representing the extraneous information as a particular subset of data subordinate to the data set.

5. The method of claim 4 including the step of defining a set of rules by which a given of synthetic gene sequence is expanded to produce an amalgam of the exact replica of a particular data set and the extraneous information.

6. The method of claim 5 including the step of defining a set of roles for implementing the extraneous information conjointly with a particular data set.

7. The method of claim 6 including the step of defining a set of rules for decryption of a particular subset of the data set using the extraneous information.

8. The method of claim 1 including the step of generating a plurality of non-replicative synthetic gene sequences as end products, such that when each of said synthetic gene sequences is expanded, it produces an exact replica of the original data set.

9. The method of claim 8 wherein the plurality of synthetic genes are pseudo randomly selected synthetic gene sequences serving as potential candidates for expansion into an exact replica of a particular data set.

10. The method of claim 9 including the step of defining a set of rules for a systematic and eventual selection of a synthetic gene sequence that will expand into an exact replica of a particular data set, using a set of rules defined by which a given synthetic gene sequence is expanded so as to produce an exact replica of a particular data set.

11. The method of claim 10 further comprising an act of retrieving the original data by expanding the synthetic gene sequence.

12. The method of claim 11 wherein information extraneous to said data set is retrieved from the synthetic gene sequence produced by including extraneous information in the data set and defining rules for representing the extraneous information as a particular subset of data subordinate to the data set.

13. The method of claim 12 including the step of defining a set of rules by which a given synthetic gene sequence is expanded to produce an amalgam of the exact replica of a particular data set and the extraneous information.

14. The method of claim 13 including the step of defining a set of rules for implementing the extraneous information conjointly with a particular data set.

15. The method of claim 14 including the step of defining a set of rules for decryption of a particular subset of the data set using the extraneous information.

16. The method of claim 9 further comprising an act of retrieving the original data by expanding the synthetic gene sequence.

17. The method of claim 16 wherein information extraneous to said data set is retrieved from the synthetic gene sequence produced by including extraneous information in the data set and defining rules for representing the extraneous information as a particular subset of data subordinate to the data set.

18. The method of claim 17 including the step of defining a set of rules by which a given synthetic gene sequence is expanded to produce an amalgam of the exact replica of a particular data set and the extraneous information.

19. The method of claim 18 including the step of defining a set of rules for implementing the extraneous information conjointly with a particular data set.

20. The method of claim 14 including the step of defining a set of rules for decryption of a particular subset of the data set using the extraneous information.

21. The method of claim 8 further comprising an act of retrieving the original data by expanding the synthetic gene sequence.

22. The method of claim 21 wherein information extraneous to said data set is retrieved from the synthetic gene sequence produced by including extraneous information in the data set and defining rules for representing the extraneous information as a particular subset of data subordinate to the data set.

23. The method of claim 22 including the step of defining a set of rules by which a given synthetic gene sequence is expanded to produce an amalgam of the exact replica of a particular data set and the extraneous information.

24. The method of claim 23 wherein including the step of defining a set of rules for implementing the extraneous information conjointly with a particular data set.

25. The method of claim 24 including the step of defining a set of rules for decryption of a particular subset of the data set using the extraneous information.

26. The method of claim 1, wherein information extraneous to the data set is incorporated into a particular synthetic gene sequence.

27. The method of claim 26 including the step of defining a set of rules for representing the extraneous information as a particular subset of data subordinate to the data set.

28. The method of claim 27 including the step of defining a secondary set of rules by which a given synthetic gene sequence is expanded so as to produce an amalgam of the exact replica of a particular subset of the data set and the extraneous information.

29. The method of claim 28 including the step of defining a set of rules for systematic and eventual selection of a synthetic gene sequence that will expand into an exact replica of a particular data set and said extraneous information, using a set of rules for representing the extraneous information as a particular subset of data subordinate to the data set and a secondary set of rules by which a given synthetic gene sequence is expanded so as to produce an amalgam of the exact replica of a particular data set and the extraneous information.

30. The method of claim 29 further comprising an act of retrieving the original data set by expanding the synthetic gene sequence.

31. The method of claim 30 wherein information extraneous to said data set is retrieved from the synthetic gene sequence produced by including extraneous information in the data set and defining rules for representing the extraneous information as a particular subset of data subordinate to the data set.

32. The method of claim 31 including the step of defining a set of rules by which a given synthetic gene sequence is expanded to produce an amalgam of the exact replica of a particular data set and the extraneous information.

33. The method of claim 28 further comprising an act of retrieving the original data by expanding the synthetic gene sequence.

34. The method of claim 33 wherein information extraneous to said data set is retrieved from the synthetic gene sequence produced by including extraneous information in the data set and defining rules for representing the extraneous information as a particular subset of data subordinate to the data set.

35. The method of claim 34 including the step of defining a set of rules by which a given synthetic gene sequence is expanded to produce an amalgam of the exact replica of a particular data set and the extraneous information.

36. The method of claim 35 including the step of defining a set of rules for implementing the extraneous information conjointly with a particular data set.

37. The method of claim 36 including the step of defining a set of rules for decryption of a particular subset of the data set using the extraneous information.

38. The method of claim 27 further comprising an act of retrieving the original data by expanding the synthetic gene sequence.

39. The method of claim 38 wherein information extraneous to said data set is retrieved from the synthetic gene sequence produced by including extraneous information in the data set and defining rules for representing the extraneous information as a particular subset of data subordinate to the data set.

40. The method of claim 34 including the step of defining a set of rules by which a given synthetic gene sequence is expanded to produce an amalgam of the exact replica of a particular data set and the extraneous information.

41. The method of claim 40 including the step of defining a set of rules for implementing the extraneous information conjointly with a particular data set.

42. The method of claim 41 including the step of defining a set of rules for decryption of a particular subset of the data set using the extraneous information.

43. The method of claims 26 further comprising an act of retrieving the original data by expanding the synthetic gene sequence.

44. The method of claim 43 where in information extraneous to said data set is retrieved from the synthetic gene sequence produced by including extraneous information in the data set and defining rules for representing the extraneous information as a particular subset of data subordinate to the data set.

45. The method of claim 44 including the step of defining a set of rules by which a given synthetic gene sequence is expanded to produce an amalgam of the exact replica of a particular data set and the extraneous information.

46. The method of claim 45 including the step of defining a set of rules for implementing the extraneous information conjointly with a particular data set.

47. The method of claim 46 including the step of defining a set of rules for decryption of a particular subset of the data set using the extraneous information.

48. The method of claim 1 further comprising an act of retrieving the original data by expanding the synthetic gene sequence.

49. The method of claim 48 wherein information extraneous to said data set is retrieved from the synthetic gene sequence produced by including extraneous information in the data set and defining rules for representing the extraneous information as a particular subset of data subordinate to the data set.

50. The method of claim 49 including the step of defining a set of rules by which a given synthetic gene sequence is expanded to produce an amalgam of the exact replica of a particular data set and the extraneous information.

51. The method of claim 50 including the step of defining a set of rules for implementing the extraneous information conjointly with a particular data set.

52. A computer data structure comprising encrypted data produced by generating a population of synthetic genes and transforming the data and the synthetic genes together with an encryption key to generate a synthetic gene sequence as the end product, such that when said gene sequence is expanded, It produces an exact replica of the data from which the gene sequence was synthesized.

53. A set of programming instructions that when executed by a computer performs a method for encrypting a data set comprising the steps of generating a population of synthetic genes and transforming the data set and the synthetic genes together with an encryption key to generate a synthetic gene sequence as the end product, such that when said gene sequence is expanded, produces an exact replica of the original data set.

54. A system for encrypting a particular set of data using genetic algorithms which comprises: a computer having a processor, memory for data and programming instruction storage, a data input and a data output; and a set of programming instructions that when executed by the computer encrypts the particular set of data by generating a population of synthetic genes and transforming the data set and the synthetic genes together with an encryption key to create a synthetic gene sequence, such that when said gene sequence is expanded, it produces an exact replica of the particular data set from which the gene sequence was synthesized.

55. A method for encrypting a particular set of data, comprising the steps of generating a population of synthetic genes and transforming the data set and the synthetic genes together with an encryption key into a set of numbers in the range 0 to n, using a cypher algorithm to generate a synthetic gene sequence as the end product, such that when said gene sequence is expanded, it produces an exact replica of the particular data set.

\* \* \* \* \*